May 10, 1955  H. C. KIEHL  2,707,936
EXERCISING AND TRAINING PERCH FOR BIRDS
Filed Jan. 28, 1954
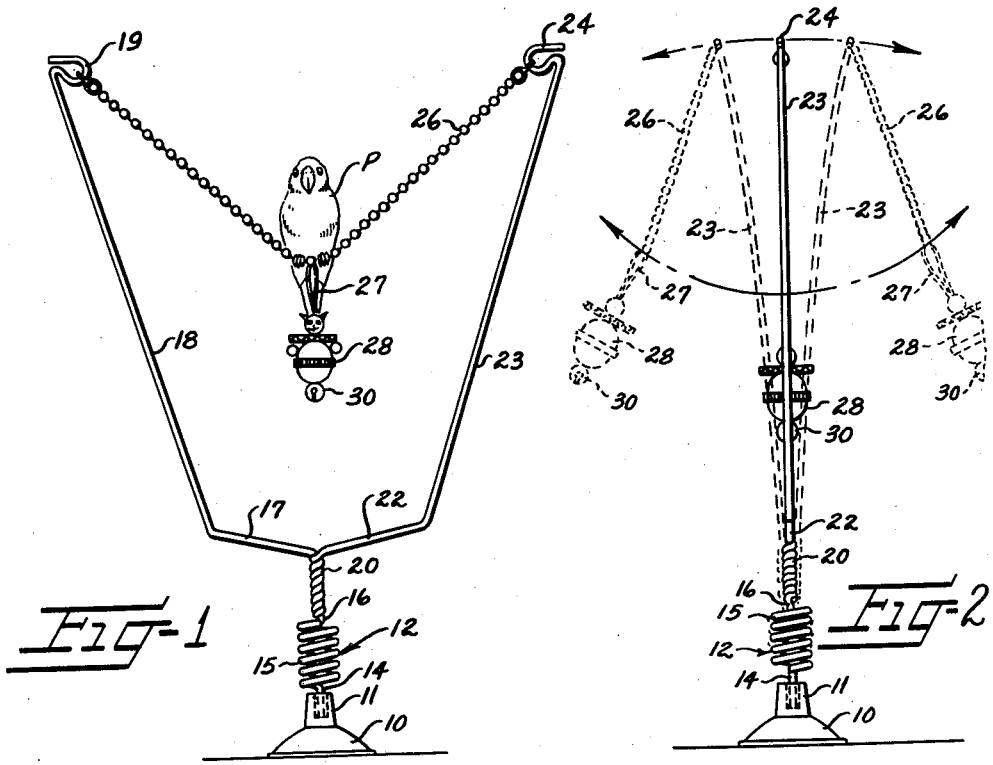
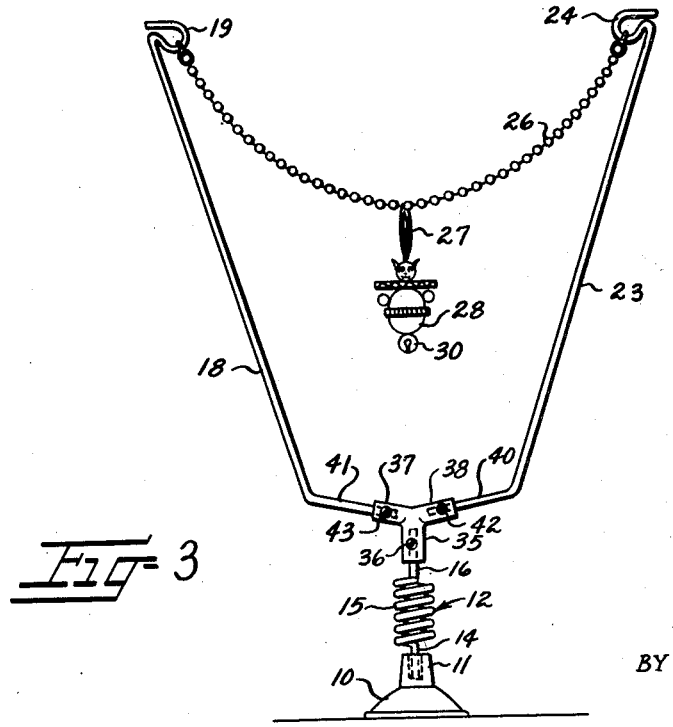
HOWARD C. KIEHL,
INVENTOR.
BY Eaton & Bell
ATTORNEYS.

United States Patent Office 2,707,936
Patented May 10, 1955

2,707,936

EXERCISING AND TRAINING PERCH FOR BIRDS

Howard C. Kiehl, Sarasota, Fla.

Application January 28, 1954, Serial No. 406,774

6 Claims. (Cl. 119—26)

This invention relates to an amusement and exercising device for pet birds such as parakeets, canaries, lovebirds and other types of birds which are kept confined within a room or cage but is especially adapted to parakeets as they seem to enjoy such an exercising device and it rapidly advances their education and training.

It is an object of this invention to provide a resilient member having a coil therein and mounted in a suitable base and having diverging prongs between which is suspended a chain in a rather loose manner which forms a perch for a bird and which gives it violent exercise but which also amuses the bird at the same time.

It is another object of this invention to provide an amusement and exercising device for pet birds comprising a suitable base member and an uprising resilient member mounted in a base member and said uprising member having integral or removably secured to its upper end a pair of diverging prongs which have hooked portions on their upper ends between which is suspended a chain-like member so as to give a ball bearing effect to the exercising device, since when the bird alights on it, it has to manipulate its wings and its balancing properties in order to maintain balance on this precarious perch.

Some of the objects of this invention having been stated, other objects will appear as the description proceeds when taken in connection with the accompanying drawings, in which—

Figure 1 is an elevation of the device with a parakeet perched thereon;

Figure 2 is an edge view of Figure 1 and showing in dotted line positions how the perch may assume different position from that of vertical;

Figure 3 is an elevation similar to Figure 1 but showing the diverging prongs removable from the upper end of the vertically disposed resilient member.

Referring more specifically to the drawings, the numeral 10 indicates a suitable base such as a rubber suction cup having a vertically disposed uprising portion 11 integral therewith to which the lower end of the device may be secured.

The device comprises a wire member such as aluminum or aluminum alloy, copper or some metal or composition of metals which has a tendency to remain in an adjusted position and this member is indicated broadly at 12 and has a vertical shank portion 14 which is adapted to fit into a suitable vertical bore in the portion 11 of the suction cup. The wire is bent into a plurality of spiral convolutions indicated at 15 and then extends upwardly as at 16 and then extends laterally as at 17 and then laterally and upwardly as at 18 and has a hook portion 19 on the upper end thereof.

A second wire is twisted as at 20 around the vertical portion of the wire 16 and then extends in a diverging relation to portion 17 as at 22 and then extends outwardly and upwardly in diverging relation to portion 18 as at 23 and this portion 23 has a hook portion 24 on the upper end thereof. Suspended between the hooks 19 and 24 is a chain-like member 26 which is similar to a key chain, comprising a plurality of balls connected together by short wires. This serves as a perch for a bird such as a parakeet, indicated at P and there may be suspended from the chain perch as at 27 a teaser, plaything, or attractive device to cause the bird to want to bite it or peck at it as indicated at 28.

If desired, there may be secured to the lower end of the teaser 28 a bell such as a sleigh bell indicated at 30. Now, instead of having the portion 20 twisted around the portion 16, the upper end of the portion 16 in Figure 3 may have a Y-shaped member 35 secured to the portion 16 by having a vertical bore therein into which portion 16 projects and having a set screw 36 for holding it on the wire 16. This portion 35 has diverging tubular prongs 37 and 38 in which the lower ends of portions 40 and 41 may be secured by set screws 42 and 43 and these portions 40 and 41 extend upwardly in exact manner to portions 23 and 18 respectively and bear like reference characters. This arrangement permits removal of the diverging portions from the forked members 35 for packaging in a smaller container. The remaining portions such as the perch, the hooked members, the teaser and sleigh bell bear like reference characters to those shown in Figures 1 and 2.

It is thus seen that I have provided an amusement and exercising device for birds such as parakeets which provides not only a resilient upright member which is forked and has a chain-like perch disposed between the upper ends thereof which makes a very unstable perch for a bird and is very educational and amusing to the bird in trying to and eventually conquering the plaything in order to perch thereon, as shown in Figure 1.

It is also seen that the bird in trying to maintain stability and balance on the perch 26 will cause the device as a whole to swing laterally as shown in dotted lines in Figure 2. By means of the coil 12 an added resiliency will be given to the upright portions of the device. Also it might be added that the convolutions 15 may be extended further than shown in the drawings and this will add to the resiliency and lateral swing of the device.

In the drawings and specification there has been set forth a preferred embodiment of the invention and, although specific terms are employed, they are used in a generic and descriptive sense only and not for purposes of limitation, the scope of the invention being defined in the claims.

I claim:

1. An amusement and exercising device for pet birds, such as parakeets, comprising a base member, a resilient wire member having its lower end secured in the base member and having a plurality of spiral convolutions disposed intermediate the ends thereof, the wire member immediately above the convolutions having secured theerto another wire member and the two wire members extending away from each other in the same vertical plane and in diverging relation to each other and said last-named wire members then extending upwardly and in diverging relation to each other and said last-named wire members being resilient and having hooked portions on their upper ends and a perch member suspended loosely between the hooked portions of said last-named wire members, said perch comprising a flexible chain-like member and affording a precarious perch for a pet bird, and a teaser suspended from the perch member intermediate the ends thereof and having a bell suspended from the lower end of the teaser member.

2. An amusement and exercising device for pet birds such as parakeets comprising a resilient wire member having its lower end adapted to be secured in a support and having a plurality of spiral convolutions disposed intermediate the ends thereof, the wire member immediately above the convolutions having secured thereto another wire member and the two wire members extending away from each other in diverging relation to each other and said last-named wire members then extending upwardly and in diverging relation to each other and said last-named wire members being resilient and having retaining means on their upper ends and a perch member suspended loosely between the retaining means of said last-named wire members, said perch comprising a chain-like member and affording a precarious perch for a pet bird.

3. An amusement and exercising device for pet birds such as parakeets comprising a resilient wire member having a plurality of spiral convolutions disposed intermediate the ends thereof, the wire member immediately above the convolutions having secured thereto another wire member and the two wire members extending away from each other in the same plane and in diverging relation to each other, and said last-named wire members being resilient and having hooked portions on their upper ends and a perch member suspended loosely between the hooked portions of said last-named wire members, said perch comprising a chain-like member and affording a precarious perch for a pet bird.

4. An amusement and exercising device for birds comprising a resilient wire member having a plurality of spiral convolutions intermediate its ends, a forked member secured to the upper end of the wire member and having diverging other wire members secured to the upper end of the forked member and extending outwardly away from each other and upwardly and then extending upwardly and in diverging relation to each other at a lesser angle than the first oppositely diverging portions and having hooks on their upper ends and a chain-like perch member having its ends secured to the upper portions of the last-named wire members and being loosely suspended between the hooked portions and serving as a perch for a bird, and a teaser member suspended from an intermediate portion of the swingable perch member.

5. An amusement and exercising device for birds comprising a resilient wire member having a plurality of spiral convolutions intermediate its ends, a forked member secured to the upper end of the wire member and having a pair of diverging other wire members secured to the upper end of the resilient wire member and extending outwardly and upwardly away from each other, said diverging wire members having hooks on their upper ends and a chain-like perch member having its ends secured to the upper portions of the last-named wire members and being loosely suspended between the hooked portions and serving as a perch for a bird.

6. An amusement and exercising device for birds comprising a resilient wire member, a forked member secured to the upper end of the wire member and having a pair of diverging other wire members secured in the upper end of the forked member and extending outwardly and upwardly away from each other and having hooks on their upper ends and a chain-like perch member having its ends secured to the hooks in the upper portions of the last-named wire members and being loosely suspended between the hooked portions and serving as a perch for a bird.

References Cited in the file of this patent
UNITED STATES PATENTS

| | | |
|---|---|---|
| 173,506 | Siddall | Feb. 15, 1876 |
| 281,966 | Burgess | July 24, 1883 |
| 449,938 | Keeler | Apr. 7, 1891 |
| 679,963 | Hayward | Aug. 6, 1901 |
| 858,600 | Holm | July 2, 1907 |